United States Patent [19]

Weston et al.

[11] 3,778,248

[45] Dec. 11, 1973

[54] CHLORAMBEN PRODUCTS AND PROCESSES FOR USE WITH RICE

[75] Inventors: Warren E. Weston, Lansdale, Pa.; Anson R. Cooke, St. Thomas, V.I.

[73] Assignee: Amchem Products, Inc., Ambler, Pa.

[22] Filed: Oct. 13, 1970

[21] Appl. No.: 80,490

[52] U.S. Cl.................. 71/115, 71/84, 71/105, 71/107
[51] Int. Cl................................. A01n 9/24
[58] Field of Search........................ 71/115

[56] References Cited
UNITED STATES PATENTS
3,174,842  3/1965  McLane................. 71/115
3,252,784  5/1966  Salvesen................ 71/115
3,560,196  2/1971  Honai................... 71/115

FOREIGN PATENTS OR APPLICATIONS
1,269,029  6/1961  France................. 71/115

Primary Examiner—James O. Thomas, Jr.
Attorney—Caesar, Rivise, Bernstein & Cohen

[57] ABSTRACT

Chloramben products and processes for use with rice wherein chloramben (3-amino-2,5-dichlorobenzoic acid) and its herbicidally active functional derivatives either alone or in conjunction with other herbicides or fertilizers is applied to the pool of water in which rice grows (known as a "paddy") such that the growing rice plant remains substantially unharmed while certain common rice paddy weeds are effectively controlled.

7 Claims, No Drawings

CHLORAMBEN PRODUCTS AND PROCESSES FOR USE WITH RICE

This invention relates to chloramben products and processes for use with rice and more particularly to certain products and processes wherein heretofore unknown properties of chloramben (3-amino-2,5-dichlorobenzoic acid) are used to great advantage in connection with growing rice plants under paddy conditions.

The present invention contemplates not only the use of chloramben itself, but also its herbicidally active functional derivatives, but for the sake of brevity, the term "chloramben" will be used herein, but it is to be understood as having the broader meaning expressed hereinabove.

Furthermore, the present invention contemplates not only the use of chloramben by itself, but also certain chloramben combinations involving certain herbicides or certain fertilizers as will be described hereinafter.

The present invention also contemplates methods of use of chloramben alone or in conjunction with herbicides and/or fertilizers with respect to growing rice plants under paddy conditions.

The use of chloramben has reached spectacular proportions within a relatively short time. This compound and its herbicidally active functional derivatives is protected by U. S. Pat. No. 3,014,063, and the use of the compound is protected by U. S. Pat. No. 3,174,842, with the disclosure of said two U. S. Patents being incorporated herein by reference for all purposes including the specific disclosure of the herbicidally active functional derivatives of chloramben.

In particular, chloramben has proved to be a tremendously effective and economical pre-emergence herbicide in connection with the soybean crop. As a result of the success with the soybean crop, choramben was tested for effectiveness in connection with a wide range of economic crops.

It developed that chloramben was effective in connection with certain crops. However, it soon became evident that the economic utilization of chloramben would be generally confined to pre-emergent treatments. Tests were run using chloramben on a pre-emergence basis in connection with upland rice which is grown without flooding, and the results of such tests proved to be unsatisfactory. In particular, it was determined that under these conditions chloramben was somewhat less than satisfactory as a commercial herbicide owing to spurious rice injury raising a possibility of crop damage which made its use under these conditions commercially unattractive. Postemergent treatments of upland rice with chloramben was generally unsatisfactory owing to inadequate weed control.

As a result, research efforts in the direction of the use of chloramben in connection with the rice crop were essentially nil while research efforts were directed toward the possible use of chloramben with respect to other economic crops.

It therefore was quite surprising to discover at a considerably later time that chloramben is an effective herbicide with paddy rice, particularly when the chloramben is added to the paddy while certain common paddy weeds, such as barnyard grass, are still in a relatively young growing stage. It was further discovered that while the chloramben is effective against barnyard grass and other weeds, that the growing rice plants remain unharmed by chloramben treatments applied under paddy conditions.

Rice grown under paddy conditions employs either the direct seeding method in which seeds preferably are pre-germinated sown into the prepared seed bed which is flooded to the desired water depth at seeding or the transplantation method in which rice seedlings are grown in seed beds until they are about 20 to 35 days old at which time they are transplanted into a prepared flooded paddy. It has now been found that chloramben can be used under paddy conditions by applying it post-emergent to the rice, i.e., after the rice has emerged (about 8 to 10 cm) for direct seeded paddy rice, and after transplanting in the case of transplanted paddy rice. Moreover, it has been found that chloramben under paddy conditions has an unexpected degree of effectiveness when applied post emergent to such problem weeds as barnyard grass. This effect is particularly surprising in that chloramben is ineffective when applied post-emergent to barnyard grass at the same stage of development under upland or non-flooded conditions. While this unusual difference in post-emergent herbicidal activity on barnyard grass under upland and paddy conditions is not entirely understood it has provided an effective means for the control of a major weed problem in many rice growing areas.

Transplanting, which is the most common technique in growing paddy rice involves the separate growth of the rice plant, followed by transplant to the field when young rice plants are sufficiently strong. After the transplanting operation has been completed and appropriate fertilizers have been added, the field is then flooded to a depth of about 2 to 10 centimeters in order to produce paddy conditions. At a later time additional fertilizer, usually a nitrogen source, is added as a so-called top dressing.

In another aspect of the invention the chloramben is combined with certain popular fertilizers, especially the nitrogen sources, since it has been discovered that these common rice paddy weeds are still sufficiently young at the time that the nitrogen top dressing is to be applied so that both the chloramben and the fertilizer can be applied in a simultaneous, single application thereby saving the extra cost of a separate herbicide and fertilizer top dressing application.

A typical fertilizer that is usable with chloramben is urea or a urea prill, although it is clear that practically any fertilizer may be used so long as the chloramben can be easily combined with such fertilizer in formulation techniques well known to those skilled in the art. Other suitable fertilizers are the nitrogen sources such as ammonium nitrate, ammonium sulfate, ammonium phosphate, sodium nitrate and calcium cyanamide.

Furthermore, chloramben may be combined with other herbicides in order to achieve gratifying results under paddy conditions. While there is no intention to limit the herbicides that may be combined with chloramben, nevertheless, examples of such herbicides include nitrofen, ($KN_3$), pentachlorophenol (PCP), molinate, bromoxynil, propanil, and the hormone carboxylic acid herbicides notably the chlorinated phenoxy aliphatic acids such as 2,4-D, 2,4-DP, MCPA and MCPP, some of which are paddy herbicides in themselves, but do not offer the economy or effectiveness of the present invention.

Particularly effective combinations producing an apparent syngergistic effect are the combinations of chloramben with potassium azide ($KN_3$), 2,4-D, 2,4-DP or PCP in a ratio of about 0.5 to about 1.5 parts per part of chloramben. Illustrative of such combinations is a 1:1 combination of chloramben and $KN_3$ which applied 25 days after transplanting at a rate of 3 lbs/acre of chloramben gave about 95 percent weed control (including barnyard grass) with no injury to the rice. A similar application of $KN_3$ at 3 lbs/acre gave no control of barnyard grass. Similar results were also obtained with other of the above combinations. Particularly useful combinations are the chloramben/2,4-D and chloramben/MCPA combinations preferably in granular form and preferably in combination with a suitable granular nitrogen top dressing such as urea prills. The 2,4-D or MCPA is present in amounts such that there is applied about 0.25 to 1 lb/acre with about 1 to 2.5 lbs/acre of chloramben and about 75 to 200 lbs/acre of the nitrogen top dressing. When other herbicides are used in combination with chloramben suitable rates are; about 3 lbs/acre of propanil, about 0.25 to 0.5 lbs/acre of bromoxynil or about 3 to 5 lbs/acre of PCP.

The preparation of chloramben is now believed to be well known in the art, but simply stated, as set forth in U.S. Pat. No. 3,014,063, involves the amine substitution of the corresponding 3-nitro acid, with the preparation of the corresponding 3-nitro acid being set forth in U. S. Pat. No. 3,013,873. As set forth in U. S. Pat. No. 3,014,063, the amine substitution is achieved by using concentrated hydrochloric acid in the presence of granular tin, followed by heating. When complete solution has occurred, it is poured into water and ice to obtain the precipitated product.

The various salts, esters and other herbicidally active functional derivatives of chloramben are prepared as set forth in U. S. Pat. Nos. 3,014,063 and 3,174,842.

The liquid and granular forms of chloramben are commercially available and can be used as such or in physical admixture with other herbicides and/or nitrogen fertilizers in liquid or granular forms. A particularly advantageous product can be prepared by spraying a liquid concentrate of chloramben (6 lbs. a.e./gal) or a liquid concentrate of chloramben plus 2,4-D onto urea prills at a slow rate to avoid wetting the prills or alternatively a prilled mixture of urea and chloramben with or without additional herbicides can be prepared by mixing chloramben with molten urea and subjecting the mixture to the conventional urea prilling operation to provide a homogenous urea/chloramben prill of about 16 to 20 mesh U.S. sieve size. Such prills will contain about 2 percent chloramben and about 98 percent urea and will provide a suitable product for simultaneously applying about 2 lbs/acre of chloramben and about 100 lbs/acre of urea (usually recommended rate) in a single operation. In addition to mixtures with nitrogen fertilizer and/or other known herbicides, chloramben formulations suitable for use in the practice of this invention can also include wetting agents and other conventional excipients ordinarily employed in formulating such compositions.

The chloramben or chloramben fertilizer or herbicide combinations of this invention may be applied directly into the water of the rice paddy by spraying or application equipment well known to those skilled in the art, including machinery or hand application. The chloramben or chloramben combinations are preferably present as granules having sufficient size (generally between about 8 and about 20 mesh U.S.S.S.), such that the granules will gradually pass into solution. Such granules, however, should not be too large since it is desirable that the chloramben or chloramben combinations be sufficiently dissolved in the paddy water as to be effective at or about the time of the top dressing of fertilizer, and preferably before the barnyard grass reaches the 3 leaf stage. Barnyard grass generally attains the 1½ to 2½ leaf stage by about 8 or 12 days after transplant and for optimum results the chloramben should be applied at this stage. Nitrogen fertilizer top dressings are ordinarily applied some time between about 10 to 30 days after transplant.

Thus, while the chloramben can be applied any time after transplant up to about 12 days or later, in some cases up to 25 or 30 days, depending on weed development, flooding and water control and other factors such as temperature, fertilization, climate, etc., the nitrogen is ordinarily not added before about 8 days after transplant and in the case of combined treatments application is suitably made at about 6 to 12 days after transplanting.

If desired, the chloramben or chloramben combinations may be added to the paddy water as a liquid, either as a solution or a suspension in any of the typical formulations well known to those skilled in the art.

As discussed hereinabove, in certain instances it may be desirable to combine the chloramben with a fertilizer, such as urea. It is preferred that the chloramben and urea be applied as prills, having a particle size subject to the above noted limitations, whereby a satisfactory combined application of chloramben and urea can be obtained.

The chloramben or chloramben combinations are generally applied to the paddy water at a rate ranging from 1 to 3 lbs/acre of chloramben. It has been found that the chloramben is effective against certain common paddy weeds even at a rate as low as 1 lb/acre, and the chloramben has achieved a substantially complete kill of certain common paddy weeds at 2 lbs/acre. It may be desirable in certain instances, particularly where the paddy weeds are relatively mature and developed to increase the application rate of the chloramben to 3 lbs/acre, but beyond this there is not much increase in herbicidal action. It should, of course, be kept in mind that the water level in the paddies may vary, but normal practice is to maintain the water level between 2 and 10 centimeters. Obviously, where the water level in the paddy is relatively high, a given amount or application rate of chloramben will be diluted to a greater degree, and thus the application rate of the chloramben may have to be increased in order to compensate for higher paddy levels. The combinations of chloramben and nitrogen fertilizers have been shown to be especially effective in the nitrogen responsive varieties of rice such as the IR-8, IR-5, IR-20, IR-22, blue bonnet and others. For best results using about 2 lbs/acre of chloramben the water depth in the paddy should be maintained at about 4 to 6 cm continuously from the time of transplanting until about 1 month later. The chloramben can be added to the paddy in any of the forms noted above by uniformly spraying in liquid form or uniformly spreading granules in the paddy or if added at the time of flooding or a later flooding where it is necessary to drain after transplanting in order to allow root formation the chloramben could be added directly to the irrigation water.

It has been determined that the chloramben has shown considerable herbicidal activity with respect to barnyard grass or water grass (Echinochloa crusgalli) as well as Jussiaea suffruticosa (a water primrose). Herbicidal activity has also been observed with respect to broadleaf weeds like Lindernia procumbens (false pimpernil) and the sedges (Cyprus difformis). Other grasses, broadleaves and sedges that are effectively controlled are for example Brachiaria, crabgrass, giant foxtail, red rice, water Bermuda (knot grass), gooseweed, pigweed, and the like as well as the aquatic weeds such as algae, rushes, etc.

Attention is now called to the following test examples which demonstrate the herbicidal activity of chloramben and certain chloramben formulations under paddy conditions, with such examples being for illustrative purposes only and not to be interpreted as a limitation upon the inventions disclosed and claimed herein. The rice used in the following tests was generally of the blue bonnet type, although in certain instances the IR-8 and IR-20 types were also used.

EXAMPLE I

Chloramben granules at varying rates were added to the water in transplanted paddy rice at the time of transplant. At the time of rice plant maturity there was essentially no injury to the rice plants and good control for the barnyard grass and a common water primrose as indicated in the following table:

TABLE I

| Rate of Application lbs/acre of chloramben derivative | % Rice Injury RI | Barnyard Grass % Control | | Jussiaea suffruticosa % Control | |
|---|---|---|---|---|---|
| | | RII RI | RII | RI | RII |
| 1 | 0 | 0 70 | 50 | 80 | 70 |
| 2 | 0 | 0 70 | 80 | 90 | 90 |
| 3 | 0 | 0 100 | 100 | 95 | 100 |
| 4 | 0 | 0 100 | 100 | 100 | 100 |

In the above noted example as well as all examples to follow, the per cent control is to be understood as indicating the percentage of kill. Thus, a 70 percent control means that only 30 percent of the weeds present in the check plot could be seen in the treated plot at the time of observation.

EXAMPLE II

Example II was run in conditions similar to Table I except that the chloramben granules were added ten days after the rice had been transplanted and when the barnyard grass was at the 1½ to 2½ leaf stage. Again, there was no observable injury to the rice, and good control was obtained as indicated in the following table.

TABLE II

| Rate of Application lbs/acre of chloramben derivative | % Rice Injury RI | Barnyard Grass % Control | | Jussiaea suffruticosa % Control | |
|---|---|---|---|---|---|
| | | RII RI | RII | RI | RII |
| 1 | 0 | 0 70 | 50 | 80 | 50 |
| 2 | 0 | 0 90 | 70 | 90 | 90 |
| 3 | 0 | 0 90 | 90 | 90 | 95 |
| 4 | 0 | 0 90 | 90 | 95 | 95 |

EXAMPLE III

Further tests were run using the ammonium salt of chloramben and the methyl ester of chloramben, and using Wagner pots as plots.

Here a pre-emergence and three post-emergence chemical applications at different times were made in order to determine the effectiveness of chloramben at various stages of the rice plant growth under paddy conditions.

The pre-emergence application was made prior to the time that the barnyard grass had sprouted. The first post-emergence application was made when the barnyard grass was at the one leaf stage, the Lindernia procumbens (broadleaf false pimpernil) had not as yet sprouted and the Cyperus difformis (sedges) had also not sprouted.

The second post-emergence chemical application was made three days later when previously untreated paddies had barnyard grass at the two leaf stage, wherein the Lindernia procumbens was vigorously germinating and the Cyperus difformis was at the germinating stage.

The third post-emergence chemical application was made to previously untreated weeds growing among rice plants under paddy conditions wherein the barnyard grass was at the three leaf stage and the Lindernia procumbens and cyperus difformis were vigorously growing.

TABLE III

These observances were made 27 days after the pre-emergence application, 21 days after the first post-emergence application, 18 days after the second post-emergence application and 15 days after the third post-emergence application.

BARNYARD GRASS

| Rate of Application lbs/acre of chloramben derivative (Ammonium salt) | Pre-emergence | Post-emergence | | |
|---|---|---|---|---|
| | | 1st | 2nd | 3rd |
| 0.96 | 81.7 | 60.7 | 78.3 | 53.3 |
| 1.92 | 98.7 | 73.3 | 90.7 | 70 |
| 2.88 | 100 | 98.3 | 93.3 | 79 |
| 3.84 | 100 | 98.7 | 97.7 | — |

| Rate of Application lbs/acre of chloramben derivative (Methyl ester) | Pre-emergence | Post-emergence | | |
|---|---|---|---|---|
| | | 1st | 2nd | 3rd |
| 0.96 | 96 | 94.7 | 94.7 | 20 |
| 1.92 | 98.7 | 90 | 94.3 | 43.3 |
| 2.88 | 99.3 | 99 | 100 | 66.7 |
| 3.84 | 100 | 100 | 100 | — |

Lindernia procumbens

| Rate of Application lbs/acre of chloramben derivative (Ammonium salt) | Pre-emergence | Post-emergence | | |
|---|---|---|---|---|
| | | 1st | 2nd | 3rd |
| 0.96 | 96 | 93.3 | 95.7 | 93.3 |
| 1.92 | 100 | 98.3 | 100 | 91.7 |
| 2.88 | 100 | 100 | 100 | 100 |
| 3.84 | 100 | 100 | 100 | — |

| Rate of Application lbs/acre of chloramben derivative (Methyl ester) | Pre-emergence | Post-emergence | | |
|---|---|---|---|---|
| | | 1st | 2nd | 3rd |
| 0.96 | 93.3 | 81.7 | 100 | 93.3 |
| 1.92 | 100 | 96.7 | 99.7 | 96 |
| 2.88 | 100 | 100 | 100 | 100 |
| 3.84 | 100 | 100 | 100 | — |

Cyperus difformis

| Rate of Application lbs/acre of chloramben derivative | Pre- | Post-emergence |

| (Ammonium salt) | emergence | 1st | 2nd | 3rd |
|---|---|---|---|---|
| 0.96 | 86.7 | 78 | 89.7 | 93.3 |
| 1.92 | 93.3 | 85 | 100 | 90 |
| 2.88 | 99 | 100 | 98.3 | 93.3 |
| 3.84 | 99.3 | 91.7 | 98 | — |

| Rate of Application lbs/acre of chloramben derivative (Methyl ester) | Pre-emergence | Post-emergence | | |
|---|---|---|---|---|
| | | 1st | 2nd | 3rd |
| 0.96 | 57.5 | 75 | 76.7 | 53.3 |
| 1.92 | 84.3 | 83.3 | 93.7 | 55 |
| 2.88 | 97.7 | 99 | 99.7 | 88.3 |
| 3.84 | 100 | 100 | 100 | — |

EXAMPLE IV

The combination of the chloramben and urea fertilizer has proved to be quite effective. In a preferred embodiment the chloramben is applied to urea prill. The combination of herbicide and fertilizer is applied to the water in the paddy, preferably at the time of 1½ to 2½ leaf stage of barnyard grass. Normally, the application of a top dressing of fertilizer at this time, while necessary to sustain vigorous growth of the rice plant, also promotes vigorous growth of the barnyard grass. This is because at the 1½ to 2½ leaf stage it has been determined that the barnyard grass is particularly receptive to fertilizer action. However, under the present invention, it has been discovered that the chloramben will completely nullify the action of the fertilizer with respect to the barnyard grass and so while the rice plant development is being promoted by the fertilizer, the barnyard grass is subjected to total kill by the herbicide. The following table illustrates the effectiveness of chloramben and urea:

TABLE IV

| Rate of Application lbs/acre of chloramben applied as urea/chloramben combination (98% urea, 2% chloramben) | % Rice Injury | Barnyard Grass & Control | Sedges % Control | |
|---|---|---|---|---|
| 1.0 | 0 | 50 | 10 | 10 5 |
| 2.0 | 0 | 95 | 100 | 50 80 |
| 3.0 | 0 | 90 | 100 | 90 100 |

From the foregoing it will be seen that an application of 3 lbs/acre gave essentially complete control of both barnyard grass and sedges, and there was no harm to the rice.

It will also be seen from the foregoing that it was quite surprising to determine the effectiveness and selectivity of chloramben under paddy conditions as compared with the dis-appointing results in pre-emergence application to upland rice. Furthermore, the combination of chloramben and a fertilizer achieves herbicide action as to common paddy weeds, but fertilizing action as to the rice plants.

EXAMPLE V

The following comparison was made to determine the importance of applying the chloramben under paddy conditions in order to achieve effective control of barnyard grass in post-emergent treatments.

Prepared test plots were seeded with barnyard grass. Half of the test plots were then flooded with about 3 to 6 cm. of water to simulate paddy or lowland rice conditions. The unflooded plots were to simulate dry or upland rice conditions. Flooding of the plots was done within two to three days after seeding. After the barnyard grass had reached the 1½ to 2½ leaf stage (between 6 to 12 days after planting) the plots were treated with chloramben applied as an aqueous spray.

Untreated plots for both the flooded and unflooded plots were maintained as controls. The plots were read for effect on barnyard grass about 20 to 25 days after treatment and rated on the basis of per cent injury to the barnyard grass; 0 being no effect as compared to the control and 100 percent being complete kill of all barnyard grass.

The results were as follows:

TABLE V

Barnyard Grass Control under Paddy and Upland Conditions

| Conditions | Rate of Chloramben Application lbs/acre | % Injury to Barnyard Grass |
|---|---|---|
| Paddy | 2 | 95 |
| | 4 | 99 |
| Upland | 2 | 0 |
| | 3 | 0 |

EXAMPLE VI

Granular Chloramben

A 2 lb/gal. ammonium salt solution of chloramben was sprayed on tumbling Attapulgite clay, 8/15 Mesh, to avoid lumping and balling. The surplus moisture added by way of the chloramben solution was evaporated with warm air in an oven. The dry chloramben granules contain 2.16 percent ammonium salt of chloramben and 97.84 percent inerts and have an 8 to 15 mesh size.

EXAMPLE VII 2 percent chloramben on urea prills was prepared carefully spraying 6 lb/gal. chloramben liquid on commercially available urea prills. The spraying was carried out at a slow rate to avoid causing any dissolution of the prills. The dry product contains 2.0 percent/wt. chloramben acid equivalent (as ammonium salt).

EXAMPLE VIII

| | Gals. | Lbs. |
|---|---|---|
| Chloramben, 2 lb/gal. | 1.00 | 9.21 |
| Ethyl ester of 2,4-D | 0.04 | 0.46 |
| Attapulgus clay, 8/15 mesh, bone dry | — | 90.33 |
| | | 100.00 |

An even impregnation of Attapulgus clay ( 8 to 15 mesh, bone dry) was obtained by using a fine spray of a solution of chloramben and ethyl ester of 2,4-D over a prolonged period of time. This formula provides for the retention of all the moisture added by way of the chloramben solution. The moisture is 7 percent of the final product. Subsequent drying is not required. The product contains 2.0 percent/wt. chloramben acid equivalent and 0.4 percent/wt, 2,4-Acid equivalent.

EXAMPLE IX

Chloramben/PCP Granular

| | Lbs. |
|---|---|
| Chloramben, Granular, 10% | 30.0(%) |
| Santobrite, No. 1 fines, 90% | 16.7 |
| Attapulgite, 24/48 ALVM | 51.2 |
| Igepal RC 630 | 0.1 |
| Water | 2.0 |
| | 100.0 |

A water dilution of Igepal RC-630 was prepared and sprayed onto a tumbling mix of the remaining components. It is assumed that if the chloramben granular is up to specifications with 10 percent moisture content, enough of the moisture will be lost in the handling so that a final residual of 10 percent will not be exceeded though moisture should be checked and adjusted. The mix was tumbled for 15 to 20 minutes to assure an even dispersion of all components. The final product contains:

Chloramben as the ammonium salt — 3 percent equivalent;
Pentachlorophenol, Sodium salt — 15 percent.

EXAMPLE X

Chloramben/2,4-D/Urea Prills

|  | Lbs. |
|---|---|
| Urea prills, 2% chloramben | 99.08(%) |
| 87.8% ae | 0.46 |
| Attasorb | 0.46 |
|  | 100.00 |

Ethyl ester of 2,4-D was applied to the chloramben prills prepared as above while tumbling. When the fluids have been completely dispersed thettasorb was added and tumbling continued until the dustiness has disappeared. The product contains:

Chloramben, 2 percent ae as the ammonium salt;
2,4-D, 0.4 percent acid equivalent as the ethyl ester.

EXAMPLE XI

Transplanted Rice

Transplanted rice of the Nova 66 variety was treated with various chloramben or chloramben + 2,4-D on granule or urea prill. The rice was in the 5 to 6 leaf stage at time of transplantation, and treatment was delayed until 4 days later. In general, all treatments gave very good to excellent barnyard grass control. The outstanding treatment was chloramben + 2,4-D at 1.5 + 0.3 lb/A on the attaclay granule, giving 93 percent barnyard grass control. The corresponding chloramben + 2,4-D formulation placed on a urea prill gave 83 percent control. Chloramben alone as a 2 percent granule, or as the commercial 2 lb/gal. formulation, performed similarly to the chloramben + 2,4-D urea prill. Chloramben alone on a urea prill gave 80 percent barnyard grass control at the 1½ lb/A rate. None of the formulations gave any visible injury to the transplanted rice.

The results are shown below:

Ischaenum rugosum. The major weeds in the plot area were the following:

Ischaenum rugosum
Eleusine indica
Cynodon dactylon

All of the plots which were 20 sq. meters in size received 250 gr. of urea fertilizer (125 lb/acre urea). The treatments were applied in all locations as shown below. The rice had been transplanted on July 14 and the treatments applied July 28. The plots were rated on August 28. The variety of rice was Higueyave. This is a long-grain variety that normally takes 150 days from transplanting to harvest. Each treatment in this location was replicated twice. The results were as follows:

TABLE VII

| Chemical | Rate of Appln. lb/acre | Average % Control Grasses | Broad leaves |
|---|---|---|---|
| Check | — | 0 | 0 |
| Chloramben attaclay granule | 1.5 | 97 | 100 |
| Chloramben on urea prill | 2.5 | 95 | 100 |

Without further elaboration the foregoing will so fully illustrate our invention that others may, by applying current or future knowledge, readily adapt the same for use under various conditions of service.

What is claimed as the invention is:

1. A method of controlling weeds growing in a rice paddy comprising applying to the paddy, on a post-emergence basis, a herbicidally effective amount of a 3-amino-2,5-dichlorobenzoic acid herbicide.

2. The method of claim 1 wherein said herbicide is applied at a rate of from 1 to 3 lbs/acre.

3. The method of claim 1 wherein barnyard grass is growing in said paddy, with said herbicide being applied at the time of the 1½ to 2½ leaf stage of the barnyard grass.

4. The method of claim 1 wherein said herbicide is applied to the paddy in the form of granules.

TABLE VI

| Chemical | Rate lb/A ai | Rep. No. | Rice | Barnyard grass | Average Rice | Average Barnyard grass |
|---|---|---|---|---|---|---|
| Chloramben+2,4-D | 1.5+.3 | I | 0 | 85 | 0 | 83 |
|  |  | II | 0 | 80 |  |  |
| Chloramben+2,4-D | 1.5+.3 | I | 0 | 90 | 0 | 93 |
|  |  | II | 0 | 95 |  |  |
| 2% chloramben granules | 1.5 | I | 0 | 80 | 0 | 83 |
|  |  | II | 0 | 85 |  |  |
| Chloramben liquid | 1.5 | I | 0 | 90 | 0 | 85 |
|  |  | II | 0 | 80 |  |  |
| 2% chloramben on urea prill | 1.5 | I | 0 | 80 | 0 | 80 |
|  |  | II | 0 | 80 |  |  |

EXAMPLE XII

A series of three separate trials was put down on transplanted rice using various chloramben formulations. These trials were located in the La Vega region of the Dominican Republic.

The main grass weed in the plots was referred to as "popa" by the natives and this species was identified as 5. The method of claim 1 wherein said herbicide is combined with a fertilizer in granular form which is then applied to said paddy.

6. The method of claim 5 wherein said fertilizer is prilled urea.

7. The method of claim 1 wherein the rice plants are about 10 cm. high at the time of applying the 3-amino-2,5-dichlorobenzoic acid herbicide.

* * * * *